United States Patent
Seger et al.

(10) Patent No.: US 6,665,011 B1
(45) Date of Patent: Dec. 16, 2003

(54) CIRCUIT AND METHOD FOR RAPID READING OF AN IMAGE CELL

(75) Inventors: Ulrich Seger, Magstadt (DE); Uwe Apel, Neckartailfingen (DE); Bernd Hofflinger, Stuttgart (DE); Heinz-Gerd Graf, Magstadt (DE)

(73) Assignee: Fraunhofer Gesellschaft zur Forderung der Angewandten Forschung E.V. (DE)

( * ) Notice: Subject to any disclaimer, the term of this patent is extended or adjusted under 35 U.S.C. 154(b) by 0 days.

(21) Appl. No.: 09/147,945

(22) PCT Filed: Oct. 30, 1997

(86) PCT No.: PCT/DE97/02529

§ 371 (c)(1),
(2), (4) Date: Jun. 8, 1999

(87) PCT Pub. No.: WO98/19453

PCT Pub. Date: May 7, 1998

(30) Foreign Application Priority Data

Oct. 31, 1996 (DE) .......................................... 196 44 096

(51) Int. Cl.$^7$ .............................................. H04N 5/335
(52) U.S. Cl. ...................................................... 348/308
(58) Field of Search ................................ 348/308, 300, 348/301, 302, 303, 307; 250/208.1; 257/291, 292, 293

(56) References Cited

U.S. PATENT DOCUMENTS

| | | | | |
|---|---|---|---|---|
| 5,452,004 A | * | 9/1995 | Roberts | ....................... 348/308 |
| 5,965,871 A | * | 10/1999 | Zhou et al. | ............... 250/208.1 |
| 6,355,965 B1 | * | 3/2002 | He et al. | ..................... 348/302 |
| 2001/0045508 A1 | * | 11/2001 | Dierickx | ................... 250/208.1 |

FOREIGN PATENT DOCUMENTS

| | | |
|---|---|---|
| DE | 4209536 A1 | 9/1993 |
| EP | 0717556 A1 | 6/1996 |

* cited by examiner

Primary Examiner—Aung S. Moe
(74) Attorney, Agent, or Firm—St. Onge Steward Johnson & Reens LLC

(57) ABSTRACT

A circuitry for high-speed reading of a video cell for a video pickup chip including a plurality of such video cells disposed in the form of a two-dimensional array, and a read-out logic designed for imaging a high input signal dynamic volume onto a reduced output signal dynamic volume, wherein the photosensitive element of the video cell is connected to the first main electrode of a first MOS transistor (M0) and to the gate of a second MOS transistor (M1) such that the gate and the other main electrode of the first MOS transistor (M0) are short-circuited and applied to an invariable potential (Vpp) so as to achieve a logarithmic characteristic line, and that an output signal amplifier is connected to the second main electrode of the second MOS transistor (M1). Moreover, a method of high speed reading of this video cell is described. The invention excels itself by the provision that a further MOS transistor (Mr1) of the same charge carrier type, which is connected in parallel with the first MOS transistor (M0), is provided and has a main electrode short-circuited to the first main electrode of the first MOS transistor (M0), and that a reset voltage pulse is applicable to the gate electrode of this further MOS transistor (Mr1).

8 Claims, 1 Drawing Sheet

CIRCUIT AND METHOD FOR RAPID READING OF AN IMAGE CELL

FIELD OF THE INVENTION

The present invention relates to a circuitry for as well as a method of high-speed reading of a video cell for a video pickup chip including a plurality of such video cells disposed in the form of a two-dimensional array, and a reading logic designed for imaging a high input signal dynamic volume onto a reduced output signal dynamic volume.

PRIOR ART

A video cell of the aforementioned type is described in the German Patent DE 42 09 536 and is capable of imaging a high input signal dynamic volume in the light signals to be detected with a reliably determined, preferably logarithmic characteristic curve onto an output signal dynamic volume.

There the video cell includes at least two MOS transistors which are so connected to the photosensitive element that the photosensitive element is connected to the first main electrode of a first MOS transistor and to the gate of a second MOS transistor, and that moreover the gate and the other main electrode of the first MOS transistor are short-circuited and applied to an invariable potential so as to achieve a logarithmic characteristic curve, with an output signal amplifier with a high input impedance being connected to the second main electrode of the second MOS transistor.

In sensor cells of the type described in the aforementioned prior art document, however, a reduced potential of signal modulation may occur under certain operating conditions, i.e. in the case of a rapid signal modulation of the picked-up image field at a low excitation level. The cause of this situation is the internal resistance of the logarithm-forming transistor, which is dependent on the conditions of illumination, together with the bandwidth of the internal transmission characteristics, which is a function of the operating conditions. The consequence are trailing traces which occur particularly in dark scenes with moving bright image points, which produce an inexpedient effect.

BRIEF DESCRIPTION OF THE INVENTION

The present invention is based on the problem of providing a circuitry for as well as a method of high-speed reading of a video cell for a video pickup chip including a plurality of such video cells disposed in the form of a two-dimensional array, and a reading logic designed for imaging a high input signal dynamic volume onto a reduced output signal dynamic volume, in such a form that the afore-described trailing or retracing effect will not occur in dark recording scenes. In particular it should be ensured that the video cells described in the German Patent De 42 09 536 may be read out as rapidly as possible so that the video cells will be read immediately after each exposure operation and reset into a condition in which they are available for a repeated exposure operation.

The inventive solution is defined in claims 1 and 6. Any features improving the inventive idea are the subject matter of the dependent claims. The inventive circuitry for high-speed reading of a video cell for a video pickup chip as described in the German Patent DE 42 09 536 is so designed that a further MOS transistor of the same charge carrier type is provided, which is connected in parallel with the first MOS transistor, the so-called logarithm-forming transistor, and has a main electrode which is short-circuited to the first main electrode of the first MOS transistor whilst its other main electrode is short-circuited to the other main electrode of the first MOS transistor, and that a reset voltage pulse may be applied to the gate electrode of the further MOS transistor.

In accordance with the invention the circuit for high-speed reading is operated in such a way that a resetting phase follows the reading operation chronologically, in which reset phase a reset voltage pulse is applied to the gate of the further MOS transistor (Mr1), which is beyond the supply voltage of the transistor and causes an operating point to be set outside the weak-inversion range, which ensures a sufficiently rapid discharge of the internal node. The potential at the internal node of the video cell can thus be set to a value, within the reset phase, which corresponds to a minimum illumination intensity. The cell is hence available again for a repeated exposure.

BRIEF DESCRIPTION OF THE DRAWING

The invention will be described in the following by an exemplary embodiment, without any restriction of the general inventive idea, with reference to the drawing wherein.

DESCRIPTION OF EMBODIMENTS

Figure 1:
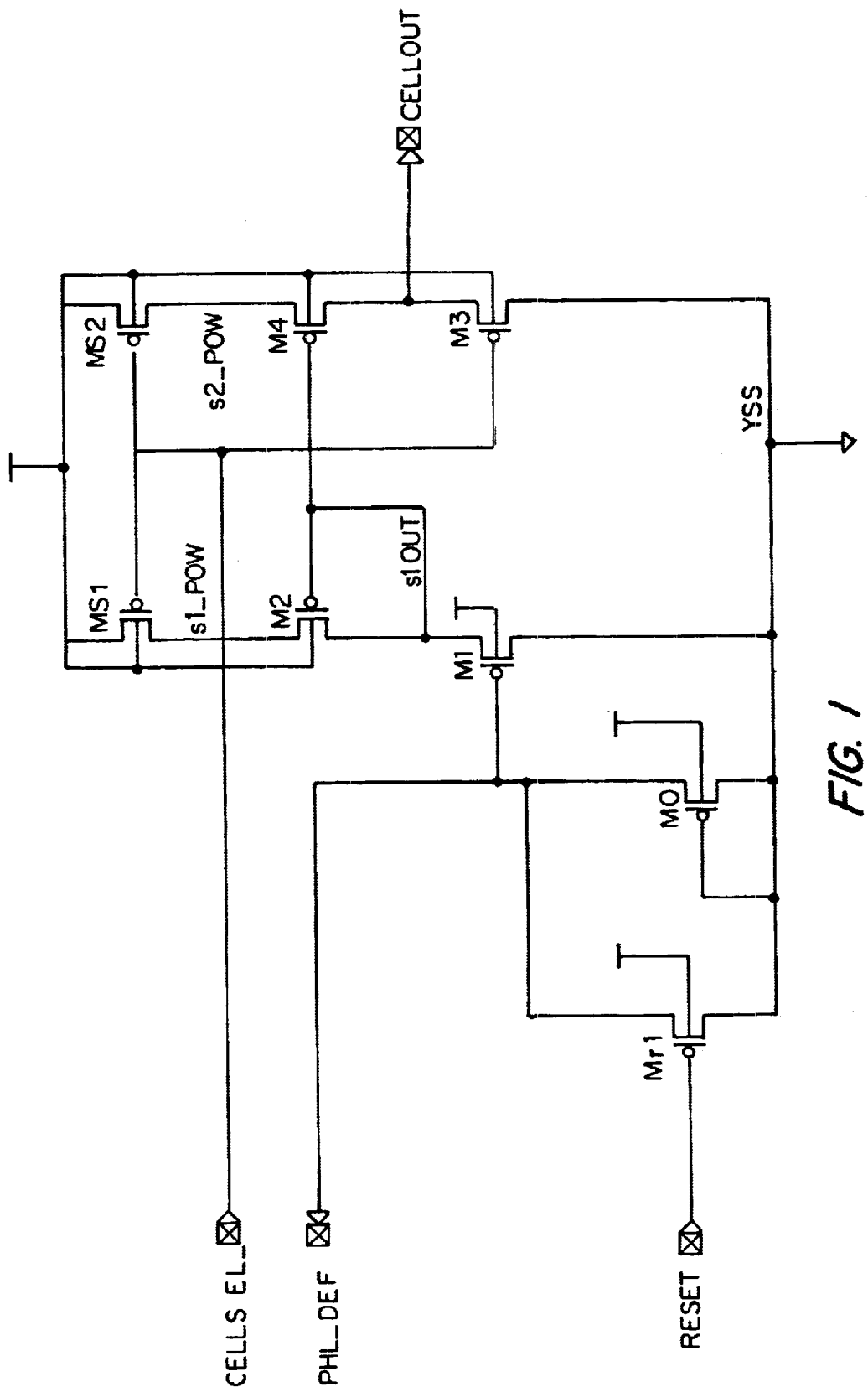
FIG. 1 illustrates a circuitry for high-speed reading of a video cell.

FIG. 1 shows a photosensitive image point of a video cell, having a photosensitive element connected to the first main electrode of a first MOS transistor M0 and to the gate of a second MOS transistor M1. The photosensitive element is defined in the circuitry by the electrical input phi-def to which the incident photon flow is applied.

A MOS transistor Mr1 of the same charge carrier type is connected in parallel with the MOS transistor M0 constituting the sensor node, which operates as logarithm-forming element due to its arrangement in the circuit. When this transistor is appropriately dimensioned it does not take an influence on the behaviour of the logarithm-forming element M0 proper as long as it remains inhibited. In a reset phase following the reading operation the transistor Mr1 is controlled with a gate voltage pulse having a defined value beyond the supply voltage (for sensor cells on p-channel transistors below a supply potential $V_{pp}$, for n-channel types above a supply potential $V_{DD}$), which ensures an operating point beyond the weak-inversion range. The conductivity which can be achieved with this provision and which, compared against the logarithm-forming transistor, is definitely higher ensures a rapid transient effect, which is shorter than one line read-out cycle, for instance, of the internal sensor node at a potential corresponding to the weak-illumination or non-illuminated condition.

The actual level to which the sensor node adjusts itself is also determined by the pulse amplitude of the reset signal because the resetting transistor Mr1, too, enters the weak-inversion range after one part of the discharge operation. The lowermost grey tone to which the sensor image can be reset directly after read-out therefore becomes adjustable by the reset level.

The reset levels beyond the regular range of the supply voltage are generated via connected capacitance elements in the circuitry assembly the line decoder directly. The level position can be determined from the outside by a reference level within the supply voltage range, which is connected to the backplate electrode. The time-related coupling of the resetting operation with the read-out operation in another line is implemented in the line decoder circuit.

The transistors illustrated in FIG. 1 are designed, for instance, as p-enhanced transistors. The photosensitive element thus constitutes the source electrode of the first MOS transistor M0, which is connected to the gate of the second MOS transistor M1 which is connected as source follower. The drain electrode of the first MOS transistor M0 is connected to a $V_{pp}$ pole of the supply voltage. The source follower M1 serves for impedance conversion and is integrated immediately beside the sensor element—in the illustrated embodiment thus the transistor M0—for achievement of appropriate high-frequency characteristics. The transistor M2 merely serves as load for the operation of the transistor M0 and is connected as source follower.

Another MOS transistor M4, which is equally connected as source follower, represents a second amplifier stage, with the transistor M3 constituting the associated load connected at the output side. The transistors MS1 and MS2 serve as switches for disconnection of the two branches of the two-stage image point amplifier in respectively not addressed lines so as to minimise the power requirements of the sensor as a whole which is composed of a plurality of such image points. The circuit of each image point is activated via the feeder cellsel_ which is connected to a controlling circuit at the margin of the sensor array. s1out is the network identification for the output of the first amplifier, s1_pow and s2_pow denote the nodes which are connected each to the first main electrode of the two transistors MS1 and MS2 connected as switches. These two nodes hence represent the connected supply voltage of the two amplifier stages.

What is claimed is:

1. Circuitry for high-speed reading of a video cell for a video pickup chip including a plurality of such video cells disposed in the form of a two-dimensional array, and a reading logic designed for imaging a high input signal dynamic volume onto a reduced output signal dynamic volume, with the photosensitive element of said video cell being connected to the first main electrode of a first MOS transistor (M0) and to the gate of a second MOS transistor (M1) such that the gate and the other main electrode of said first MOS transistor (M0) are short-circuited and applied to an invariable potential ($V_{pp}$) so as to achieve a logarithmic characteristic line, and that an output signal amplifier is connected to the second main electrode of said second MOS transistor (M1), characterized in that a further MOS transistor (Mr1) of the same charge carrier type, which is connected in parallel with said first MOS transistor (M0), is provided and has a main electrode short-circuited to said first main electrode of said first MOS transistor (M0) whilst its other main electrode is short-circuited to the other main electrode of said first MOS transistor (M0), and that a reset voltage pulse is applicable to the gate electrode of said further MOS transistor (Mr1).

2. Circuitry according to claim 1, characterised in that said reset voltage pulse, which is negative relative to said invariable potential (Vpp), is applicable to the gate of said further MOS transistor (Mr1) chronologically after the operation of image cell read-out.

3. Circuitry according to claim 1, characterised in that said further MOS transistor (Mr1) in the inhibited condition does not take an influence on said first MOS transistor (M0).

4. Circuitry according to claim 1, characterised in that connected capacitance elements are provided which generate said reset voltage pulse.

5. Circuitry according to claim 4, characterised in that a decoder circuit is provided for controlling discrete video cell lines, which comprises said connected capacitance elements.

6. Method of high-speed reading of a video cell in a video pickup chip including a plurality of such video cells, using the circuitry according to claim 1, characterised in that a reset phase follows chronologically after the read-out operation, during which said reset voltage pulse is applied to the gate of said further MOS transistor (Mr1), which is beyond the supply voltage of said transistor and which ensures an operating point beyond the weak-inversion range.

7. Method according to claim 6, characterised in that due to the application of said reset voltage pulse said further MOS transistor (Mr1) receives a conductivity higher than the conductivity of said first MOS transistor (M0).

8. Method according to claim 6, characterised in that the succession in time of said read-out operation and an operation of resetting a video cell is controlled by a line decoder circuit and is hence subjected to a coupling which is invariable in terms of time.

* * * * *